US010583701B2

(12) United States Patent
Yu et al.

(10) Patent No.: US 10,583,701 B2
(45) Date of Patent: Mar. 10, 2020

(54) TIRE PRESSURE DETECTOR WITH PROTECTION SHELL

(71) Applicant: CUB ELECPARTS INC., Changhua County (TW)

(72) Inventors: San-Chuan Yu, Changhua County (TW); Kuo-Ting Lee, Changhua County (TW); Ming-Li Chou, Changhua County (TW)

(73) Assignee: Cub Elecparts Inc., Changhua County (TW)

( * ) Notice: Subject to any disclaimer, the term of this patent is extended or adjusted under 35 U.S.C. 154(b) by 0 days.

(21) Appl. No.: 16/055,720

(22) Filed: Aug. 6, 2018

(65) Prior Publication Data
US 2019/0263199 A1    Aug. 29, 2019

(30) Foreign Application Priority Data
Feb. 27, 2018    (TW) .............................. 107106673 A (51) Int. Cl.
*B60C 23/04*    (2006.01)
(52) U.S. Cl.
CPC ...... *B60C 23/0491* (2013.01); *B60C 23/0447* (2013.01)
(58) Field of Classification Search
None
See application file for complete search history.

(56) References Cited

U.S. PATENT DOCUMENTS

| | | | | |
|---|---|---|---|---|
| 4,024,829 A | * | 5/1977 | Su ....................... | B60C 23/0403 116/34 R |
| 4,037,192 A | * | 7/1977 | Cowit ................. | B60C 23/0403 200/61.25 |
| 4,137,520 A | * | 1/1979 | Deveau ............... | B60C 23/0433 340/443 |
| 4,539,497 A | * | 9/1985 | Boyer .................. | B60C 23/041 180/65.51 |
| 4,694,273 A | * | 9/1987 | Franchino ........... | B60C 23/0408 200/61.25 |
| 5,260,683 A | * | 11/1993 | Tanaka ................ | B60C 23/0428 116/34 R |
| 5,289,160 A | * | 2/1994 | Fiorletta ............... | B60C 23/009 116/34 R |

(Continued)

FOREIGN PATENT DOCUMENTS

CN    107933220    * 12/2017    ......... B60C 23/0433

*Primary Examiner* — Curtis J King
(74) *Attorney, Agent, or Firm* — Muncy, Geissler, Olds & Lowe, P.C.

(57) ABSTRACT

A tire pressure detector with protection shell is applied to a wheel. The wheel has a rim having an air tap and a tire mounted around the rim, with an air pressure space formed between the tire and the rim. The tire pressure detector includes a shell and a detector body. The shell is movably disposed in the air pressure space, and the detector body is disposed in a housing space of the shell. The detector body is includes a detection module for detecting the air pressure in the air pressure space, generating a pressure signal, and wirelessly transmitting the pressure signal. Therefore, by improving the structural strength of the tire pressure detector with the shell, the tire pressure detector is conveniently installed without the need of other additional tools.

14 Claims, 8 Drawing Sheets

(56) References Cited

U.S. PATENT DOCUMENTS

| | | | | |
|---|---|---|---|---|
| 5,600,301 | A * | 2/1997 | Robinson | B60C 23/0408 340/442 |
| 5,667,606 | A * | 9/1997 | Renier | B60C 23/12 152/418 |
| 5,717,135 | A * | 2/1998 | Fiorletta | B60C 23/009 340/447 |
| 5,838,229 | A * | 11/1998 | Robinson | B60C 23/0401 340/442 |
| 5,929,755 | A * | 7/1999 | Hsieh | B60C 23/0408 340/442 |
| 6,030,478 | A * | 2/2000 | Koch | B60C 23/04 156/123 |
| 6,101,870 | A * | 8/2000 | Kato | B60C 23/0494 73/146.8 |
| 6,194,998 | B1 * | 2/2001 | Huang | B60C 23/041 340/442 |
| 6,304,172 | B1 * | 10/2001 | Katou | B60C 23/0433 340/445 |
| 6,340,929 | B1 * | 1/2002 | Katou | B60C 23/0433 340/445 |
| 6,518,877 | B1 * | 2/2003 | Starkey | B60C 23/004 340/447 |
| 6,799,455 | B1 * | 10/2004 | Neefeldt | B60C 23/0496 73/146 |
| 6,885,291 | B1 * | 4/2005 | Pollack | B60C 23/0433 116/34 R |
| 2001/0008083 | A1 * | 7/2001 | Brown | B60C 23/0408 73/146 |
| 2002/0149477 | A1 * | 10/2002 | Desai | B60C 23/0416 340/442 |
| 2002/0174925 | A1 * | 11/2002 | Wilson | B60C 23/04 152/415 |
| 2003/0150261 | A1 * | 8/2003 | Koch | B60C 5/004 73/146 |
| 2003/0156024 | A1 * | 8/2003 | Beckley | B60C 23/0408 340/447 |
| 2004/0066287 | A1 * | 4/2004 | Breed | B60C 23/0433 340/442 |
| 2004/0154388 | A1 * | 8/2004 | Wilson | B60C 23/0408 73/146 |
| 2005/0051249 | A1 * | 3/2005 | Lee | B60C 5/20 152/158 |
| 2005/0172708 | A1 * | 8/2005 | Beckley | B60C 23/0433 73/146 |
| 2005/0262934 | A1 * | 12/2005 | Naidu | B60C 23/0408 73/146 |
| 2005/0269003 | A1 * | 12/2005 | Fujii | B60C 11/24 152/154.2 |
| 2006/0044118 | A1 * | 3/2006 | Katou | B60C 23/0408 340/425.5 |
| 2006/0061463 | A1 * | 3/2006 | Wilson, II | B60C 23/009 340/447 |
| 2006/0237109 | A1 * | 10/2006 | Mangold | B60C 23/0493 152/152.1 |
| 2007/0085668 | A1 * | 4/2007 | Katou | B60C 23/0433 340/447 |
| 2007/0120658 | A1 * | 5/2007 | Okubo | B60C 23/0433 340/445 |
| 2007/0144248 | A1 * | 6/2007 | Okubo | B60C 23/0432 73/146.4 |
| 2007/0180901 | A1 * | 8/2007 | Katou | B60C 23/0408 73/146.2 |
| 2007/0227240 | A1 * | 10/2007 | Kawase | B60C 23/0432 73/146.5 |
| 2007/0251309 | A1 * | 11/2007 | Katou | B60C 23/0408 73/146 |
| 2007/0265798 | A1 * | 11/2007 | Katou | B60C 23/0433 702/140 |
| 2008/0282965 | A1 * | 11/2008 | Crano | B60C 5/02 116/34 R |
| 2009/0027183 | A1 * | 1/2009 | Kvisteroy | B60C 23/0416 340/447 |
| 2009/0071238 | A1 * | 3/2009 | Crano | B60C 23/0408 73/146.5 |
| 2009/0079652 | A1 * | 3/2009 | Kawase | B60C 23/0408 343/788 |
| 2012/0186714 | A1 * | 7/2012 | Richardson | F04B 43/1253 152/419 |
| 2013/0074592 | A1 * | 3/2013 | Han | B60C 23/0452 73/146.5 |
| 2013/0319085 | A1 * | 12/2013 | Schwab | B60C 19/122 73/49 |
| 2014/0368327 | A1 * | 12/2014 | Darrer | G06K 19/07764 340/447 |
| 2015/0059950 | A1 * | 3/2015 | Hinque | B60C 23/12 152/450 |
| 2015/0059951 | A1 * | 3/2015 | Hinque | B60C 23/12 152/450 |
| 2015/0191055 | A1 * | 7/2015 | Schumacher | B60C 23/0481 340/447 |
| 2015/0317894 | A1 * | 11/2015 | Chen | B60C 25/00 340/665 |
| 2016/0375733 | A1 * | 12/2016 | Lesesky | G06K 19/07758 340/442 |
| 2017/0274711 | A1 * | 9/2017 | Sowah | B60C 23/0433 |
| 2017/0368892 | A1 * | 12/2017 | Heuermann | B60C 11/246 |
| 2018/0065429 | A1 * | 3/2018 | Richardson | B60C 23/10 |

* cited by examiner

TIRE PRESSURE DETECTOR WITH PROTECTION SHELL

BACKGROUND OF THE INVENTION

1. Field of the Invention

The present invention relates to tire pressure detectors, and more particularly, to a tire pressure detector with protection shell.

2. Description of the Related Art

A tire detection system is an electronic system disposed at a vehicle wheel for detecting the sufficiency of pressure of the tire, whereby the variation of tire pressure is immediately monitored and displayed through a panel board, a digital displayer, or simple light signals, so as to prevent traffic accidents from occurring due to overpressure of the tire.

The operation method of a tire detection system mainly comprises a direct type and an indirect type detection system. The indirect type tire pressure detection system, instead of directly detecting the tire pressure of a wheel, detects the rotation speed of the wheel. If the system detects the rotation speed of a certain wheel differs from the rotation speed of other wheels in a large degree, the tire pressure of the certain wheel might possibly be abnormal. Therefore, the system informs the driver of the abnormality. However, the indirect tire pressure detection system fails to provide an actual tire pressure value to the driver.

On the other hand, the direct type tire pressure detection system is provided with a detection device capable of transmitting signals, which provides an actual tire pressure value of the wheel to the driver. According to the installation method, the detection devices are further categorized into the internal type and the external type. The external type detection device is disposed at the air tap of the wheel and allowed to be manually installed. However, the detection device possesses a certain weight. When being fastened on the air tap, the detection device causes the mass of the wheel to be unevenly distributed, so as to affect the balance of the wheel. Also, the detection device shall be disassembled during the air filling process of the wheel, thus imposing a risk of damaging the detection device.

Further, when the air tap made of rubber material is combined with the external type detection device, the air tap might waves during the movement of the vehicle. After a long duration, the rubber body of the air tap may possibly be broken. On the other hand, the internal type detection device is disposed in the rim of the wheel, and a conventional fixed type tire pressure detector requires the air tap to be fastened on the rim. During the installation process, the mechanic may accidentally cause the collision between a removed tire and the air tap, or directly strike the air tap or the detector. As a result, the air tap and the detector are possibly broken, adding an additional cost.

SUMMARY OF THE INVENTION

For improving the issues above, an embodiment of the present invention discloses a tire pressure detector with protection shell disposed in the air pressure space of the tire. By protecting the detector body through the shell and sensing the air pressure in the air pressure space through the detection module, the structural strength of the tire pressure detector is improved. Also, the tire pressure detector is easily installed without necessity of additional tools, facilitating the convenience of installation.

For achieving the aforementioned objectives, a tire pressure detector with protection shell in accordance with an embodiment of the present invention is provided, which is applied to a wheel having a rim and a tire mounted around the rim, with an air pressure space formed between the tire and the rim, the tire pressure detector comprising:

a shell movably disposed in the air pressure space, the shell including a housing space; and a detector body disposed in the housing space, the detector body including a detection module, the detection module including a sensing unit, a central processing unit, a wireless transmission unit, and a power unit that are coupled with each other, the power unit providing a power, the sensing unit detecting an air pressure in the air pressure space to generate a pressure signal, the central processing unit wirelessly transmitting the pressure signal through the wireless transmission unit.

With such configuration, the tire pressure detector with protection shell is movably placed in the air pressure space, so as to move during the wheel rotation for sensing the air pressure in the air pressure space, facilitating the convenience of installation.

Further, the tire pressure detector of the present invention is simply placed in the air pressure space between the tire and the rim without the necessity of being installed according to different wheel specification or the position of the air tap. Therefore, the damage of the conventional detector or the air tap during installation is prevented. Thus, the tire pressure detector of the present invention is applicable to all specification and models of vehicle wheel, improving the application scope of the present invention.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

The aforementioned and further advantages and features of the present invention will be understood by reference to the description of the preferred embodiment in conjunction with the accompanying drawings where the components are illustrated based on a proportion for explanation but not subject to the actual component proportion.

The amount of components defined by the texts "a", "an", and "the" used in the singular form includes the embodiments of the plurality forms in the present invention, unless being otherwise defined by the context of the specification. It shall be understood that the texts such as "include" and/or "comprise" indicate that such technical features, bodies, members, modules, and/or units exist among other technical features, bodies, members, modules, and/or units, instead of excluding the existence of others.

When one component is mentioned as being "on" or "above", or being "connected", "coupled with", or "combined with" another component, it shall be understood that the component is disposed on, coupled with, connected with, or combined with the other component directly or indirectly with intermediate component therebetween.

Referring to FIG. 1 to FIG. 7, the tire pressure detector 100 with protection shell in accordance with the present invention is applied to a wheel 1 of a vehicle, wherein the vehicle is allowed to be a car or a motorcycle. In an embodiment of the present invention, the vehicle refers to a car. The wheel 1 includes a rim 2 and a tire 3 mounted around the rim 2. The rim 2 includes a rim surface 4 and an outer edge 5. The rim surface 4 faces to one end of a rotation axis of the wheel 1. The outer edge 5 is disposed around the rotation axis of the wheel 1. The tire 3 includes an outer face 6 and an inner face 7. The inner face 7 of the tire 3 faces the outer edge 5 of the rim 2, so as to be mounted on the rim 2, with an air pressure space 8 formed between the inner face 7 of the tire 3 and the outer edge 5 of the rim 2. During the vehicle movement, the outer face 6 of the tire 3 contacts the ground surface. Also, an air tap 9 is disposed on the rim face 4 of the rim 2 and connected with the air pressure space 8, such that the air tap 9 supplies air into the air pressure space 8.

The tire pressure detector 100 in accordance with an embodiment of the present invention comprises a shell 10 and a detector body 20. The detector body 20 is disposed in a housing space 11 inside the shell 10. The detector body 20 includes a detection module 21. In an embodiment of the present invention, the detection module 21 is wrapped in the detector body 20. The tire pressure detector 100 is movably disposed in the air pressure space 8, so as to sense the air pressure in the air pressure space 8 through the detection module 21 of the detector body 20. Therefore, the shell 10 protects the detector body 20 and improves the structural strength of the tire pressure detector 100. Also, the tire pressure detector 100 is allowed to be installed without addition tools, facilitating the convenience of usage.

The shell 10 is made of a thermoplastic elastic material. When the tire pressure detector 100 rolls in the air pressure space 8 together with the rotation of the wheel 1, the elastic shell 10 reduces the impact force produced between the shell 10 and the wheel 1, so as to protect the rim 2 and the tire 3. In the first, second, third, and fourth embodiments of the present invention, the shell 10 is made of rubber material.

The shell 10 is formed in a shape of a sphere, an ellipsoid, or a polyhedron. In the first, second, third, and fourth embodiments of the present invention, the shell 10 is formed in a shaped of sphere. The shell 10 includes an inner wall 12 and an outer wall 13 disposed in opposite to the inner wall 12. Also, the shell 10 includes an opening 14. The inner wall 12 surrounds the housing space 11, and the opening 14 is connected with the housing space 11. In the first and second embodiments of the present invention, the diameter of the opening 14 equals to half the diameter of the shell 10. The shell 10 is mounted on an outer periphery of the detector body 20 through the opening 14, with the detector body 20 filling the housing space 11. In the third and fourth embodiments of the present invention, the shell 10 covers the periphery of the detector body 20 through molding or other manners, with the detector body 20 filling the housing space 11. Also, the diameter of the opening 14 equals to one-tenth of the diameter of the shell 10.

Figure 2:
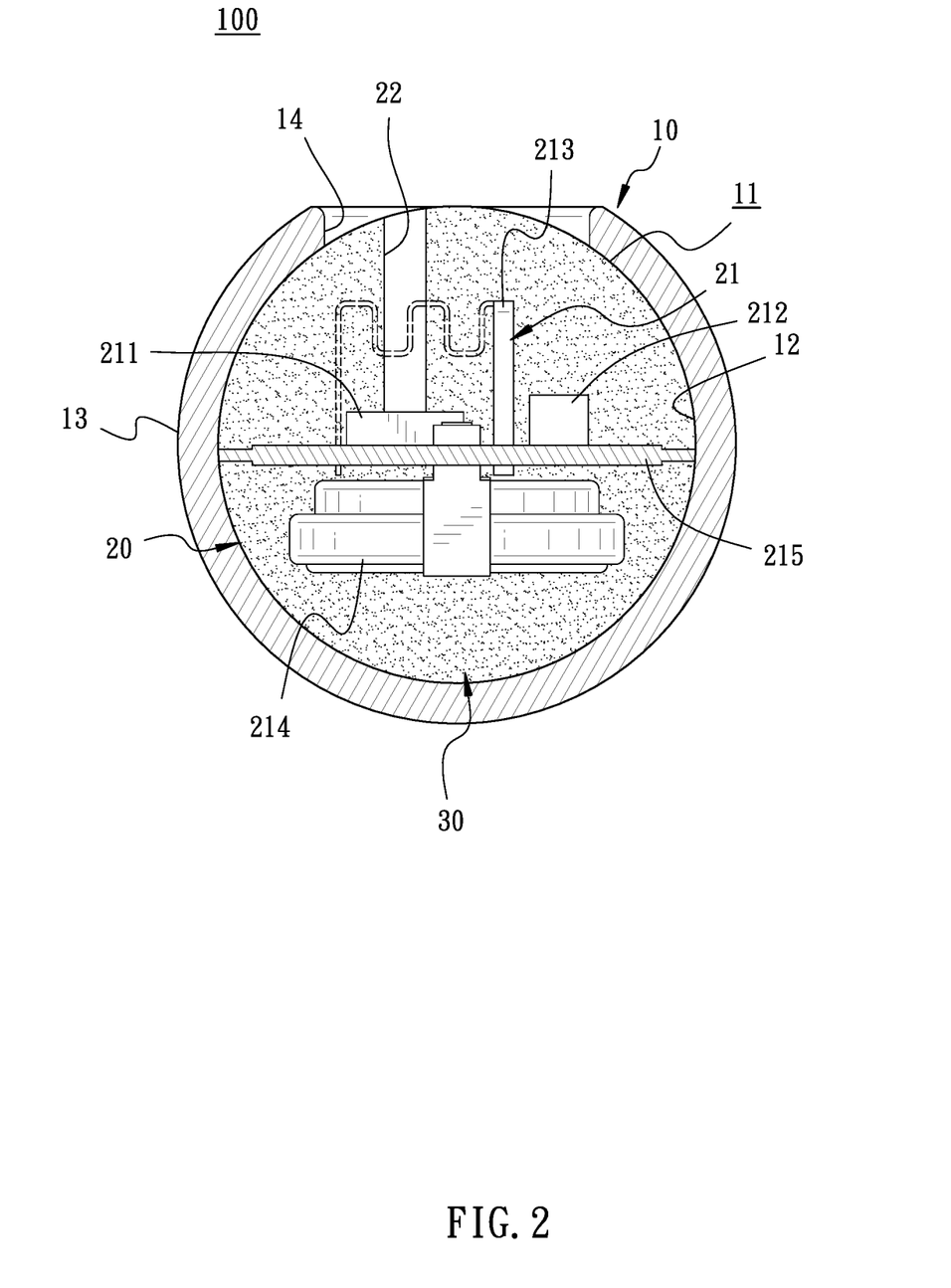
FIG. 2 is a sectional view of FIG. 1, illustrating the inner wall formed in a smooth surface.
Figure 3:
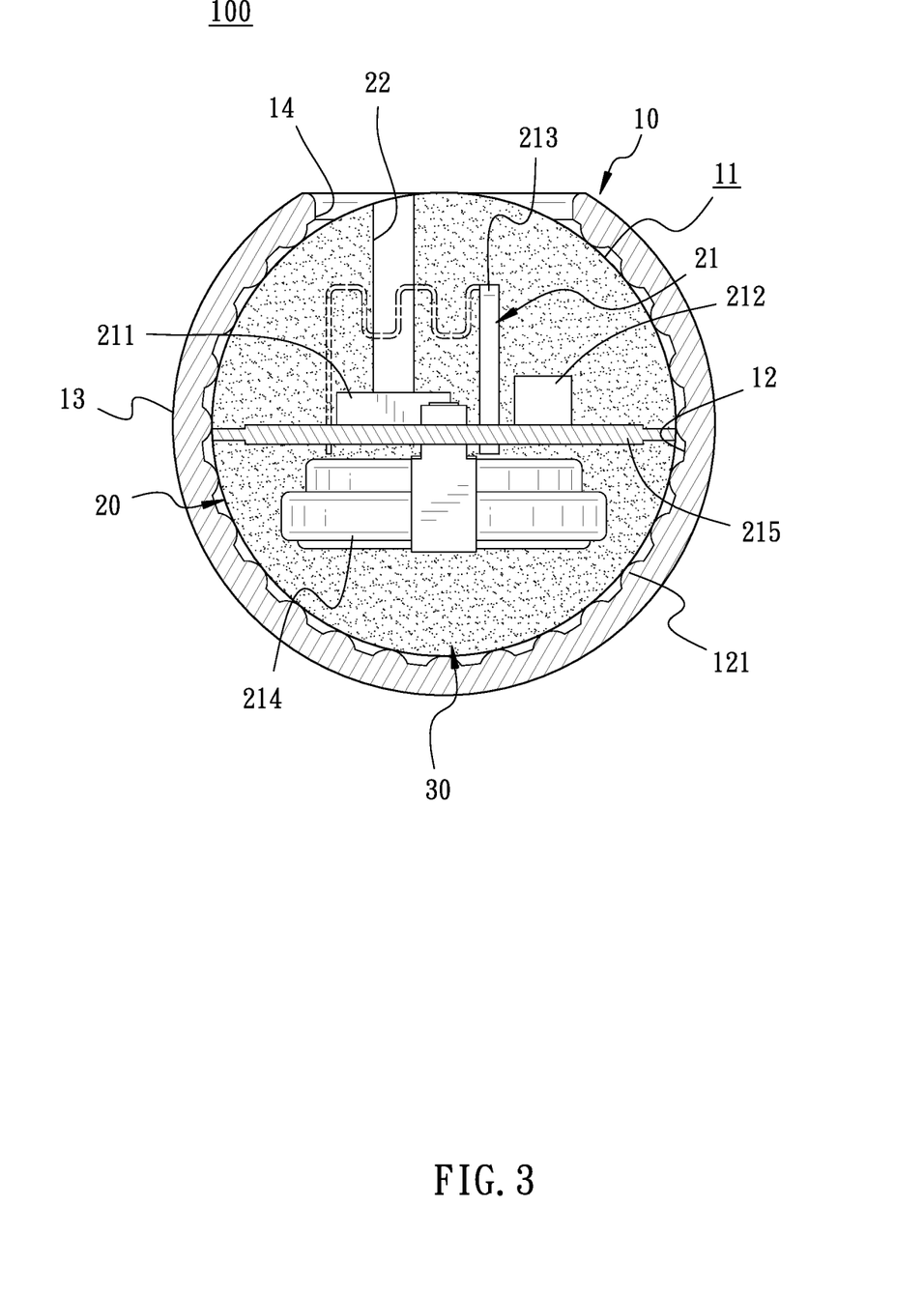
FIG. 3 is a sectional view of the tire pressure detector with protection shell in accordance with a second embodiment of the present invention, illustrating the inner wall of the tire pressure detector provided with a buffer portion.

In addition, the inner wall 12 of the shell 10 is allowed to be formed in a smooth or non-smooth surface. When the detector body 20 is disposed in the housing space 11 of the shell 10, the inner wall 12 is able to contact the outer periphery of the detector body 20. Referring to FIG. 2, in the first embodiment of the present invention, the inner wall 12 of the shell 10 is a smooth surface. Referring to FIG. 3, in the second embodiment of the present invention, the inner wall 12 of the shell 10 includes a plurality of convex buffer portions 121, wherein each buffer portion 121 is formed in an arc shape, and the buffer portions 121 are spaced with each other. The buffer portions 121 contact the outer periphery of the detector body 20. In another embodiment of the present invention, the buffer portions 121 are disposed in a continuous arrangement. Thus, when the tire pressure detector 100 is driven to roll by the rotation of the wheel 1 during the vehicle movement, the shell 10 protects the detector body 20 from directly contacting the inner face 7, lowering the abrasion of the detector body 20. Also, the buffer portions 121 lowers the effect imposed by the wheel 1 vibration upon the detector body 20, so as to achieve an additional protection to the detector body 20.

Further, the tire pressure detector 100 is directly placed in the air pressure space 8, such that the shell 10 contacts the tire 3. A heat is produced by the friction of the wheel 1 and the road surface, such that the heat is sent to the tire pressure detector 100. The buffer portions 121 of the shell 10 are able to prevent the heat from being sent to the detector body 20. Also, when the contact square measure between the detector body 20 and the buffer portions 121 decreases, the thermal resistance increases, thereby lowering the heat sent to the detector body 20 and improving the service life of the detector body 20.

Figure 4:
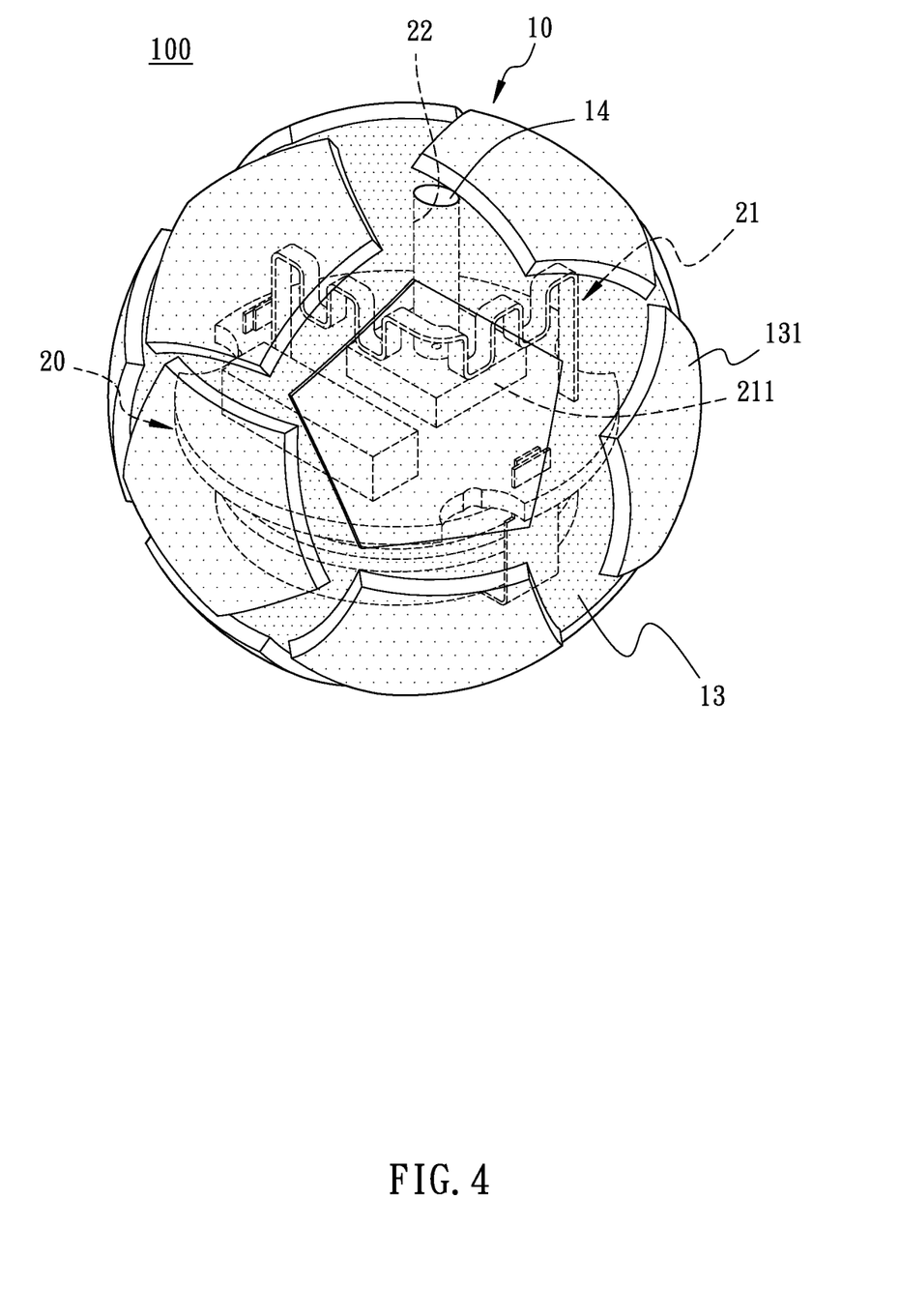
FIG. 4 is a schematic perspective view of the tire pressure detector with protection shell in accordance with a third embodiment of the present invention, illustrating the outer wall of the tire pressure detector provided with an abrasion portion.
Figure 5:
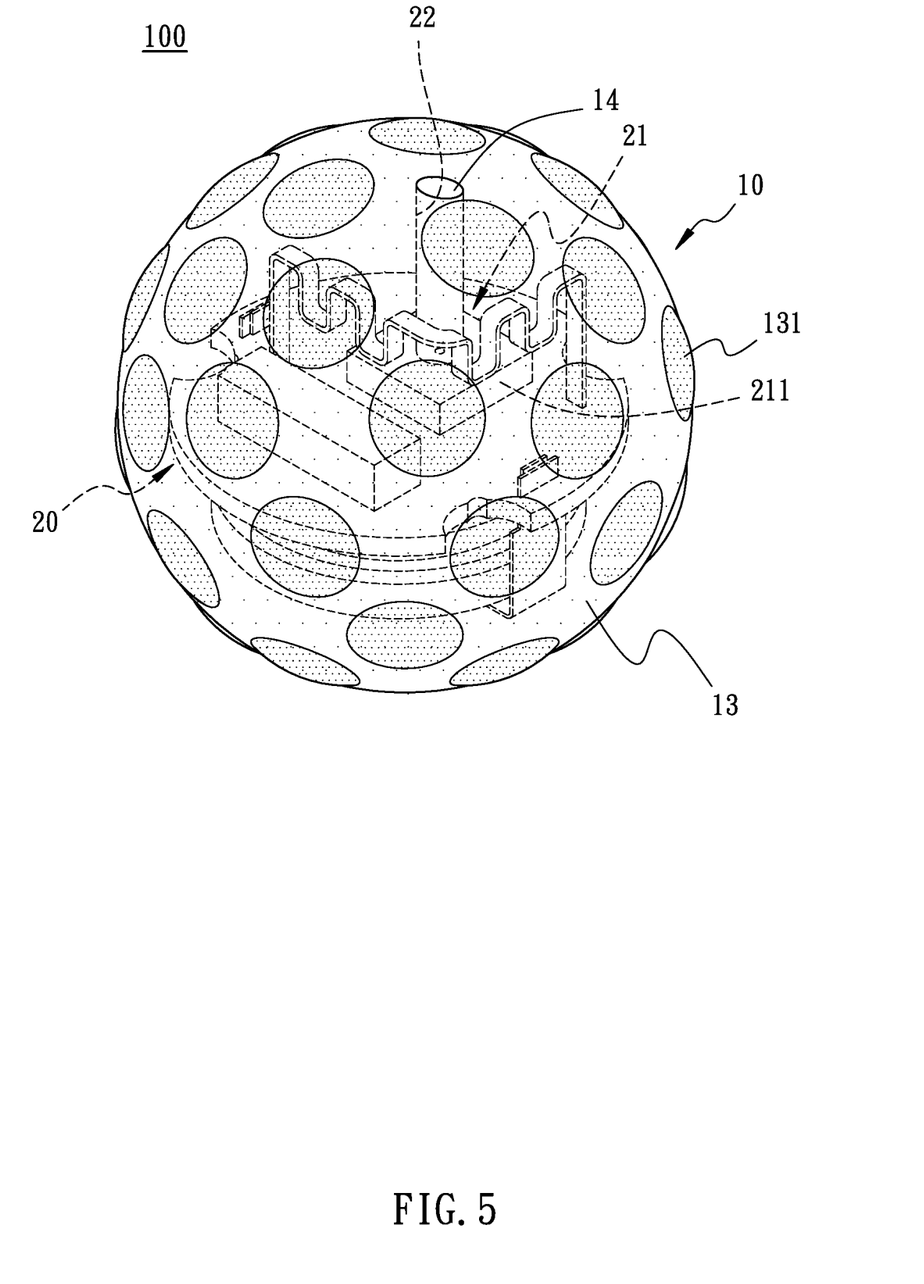
FIG. 5 is a schematic perspective view of the tire pressure detector with protection shell in accordance with a fourth embodiment of the present invention, illustrating the outer wall of the tire pressure detector provided with an abrasion portion.

When the tire pressure detector 100 is placed in the air pressure space 8, the outer wall 13 of the shell 10 contacts the inner face 7 of the tire 3, and the outer wall 13 of the shell 10 is allowed to be a smooth or non-smooth surface, wherein the shape structure of the outer wall 13 is able to be formed according to user demand. In the first and second embodiments of the present invention, the outer wall 13 of the shell 10 is formed in a smooth surface. In the third and fourth embodiments of the present invention, the outer wall 13 of the shell 10 is a formed in a non-smooth surface, with a plurality of abrasion portions 131 convexly disposed on the outer wall 13, wherein each abrasion portion 131 is formed in a spherical or polygonal protrusion. Referring to FIG. 4, in the third embodiment of the present invention, the abrasion portion 131 is formed in a hexagonal protrusion. Referring to FIG. 5, in the fourth embodiment of the present invention, the abrasion portion 131 is formed in a spherical protrusion. Therefore, when the tire pressure detector 100 rolls in the air pressure space 8 due to the rotation of the wheel 1 during the vehicle movement, through the abrasion portions 131 contacting the inner face 7, the outer wall 13 is prevent from directly contacting the inner face 7, thus increasing the structural strength of the shell 10 and protecting the detector body 20 from contacting the inner face 7 directly, thereby improving the service life of the detector body 20.

Furthermore, a heat is produced by the friction of the wheel 1 and the road surface, and the abrasion between the shell 10 of the tire pressure detector 100 and the tire 3 also produces heat. Therefore, the abrasion portions 131 of the shell 10 lowers the contact square measure between the outer wall 13 and the tire 3, so as to reduces the heat produced by the abrasion.

The detector body 20 includes a detection module 21 which is wrapped in the detector body 20. In an embodiment of the present invention, the detection module 21 is placed in a mold model, with a filler 30 subsequently filled into the model, such that the detector body 20 wraps the detection module 21 therein. The filler 30 is allowed to be made of plastic or rubber material. The plastic material includes, for example but not limited to, PA and Polybutylene terephthalate (PBT). The rubber material includes, for example but not limited to, silicone and Ethylene Propylene Diene Monomer (EPDM). The detector body 20 is allowed to be formed in a sphere, a cuboid, or a body with other shapes. In the first, second, third, and fourth embodiments of the present invention, the detector body 20 is formed in a sphere.

Also, the detection module 21 includes a sensing unit 211, a central processing unit 212, a wireless transmission unit 213, and a power unit 214 for providing the power that are coupled with each other. The detection module 21 includes a circuit substrate 215, wherein the sensing unit 211, the central processing unit 212, the wireless transmission unit 213, and the power unit 214 are disposed on the circuit substrate 215. In an embodiment of the present invention, the sensing unit 211, the central processing unit 212, and the wireless transmission unit 213 are integrated. The wireless transmission unit 213 is allowed to be chosen from Bluetooth or radio frequency antenna, wherein the frequency of the radio frequency antenna is allowed to be sub-1 GHz (lower than 1 GHz), such as 315 MHz, 434 MHz, 868 MGz or 915 MHz, also allowed to be 2.4 GMHz. The power unit 214 is a button cell battery.

In addition, the detector body 20 includes a bore 22, with the sensing unit 211 disposed on one side of the bore 22, wherein the bore 22 is connected with the opening 14 and the air pressure space 8. When the sensing unit 211 detects the air pressure in the air pressure space 8 through the bore 22, the sensing unit 211 generates a pressure signal, so as to send the pressure signal to the central processing unit 212. The central processing unit 212 receives the pressure signal and sends out the pressure signal through a wireless transmission by use of the wireless transmission unit 213. The wireless transmission unit 213 is allowed to be wirelessly connected with the electronic control unit (ECU) of the vehicle. When the electronic control unit receives the pressure signal, the air pressure in the air pressure space 8 is displayed. Alternately, when the air pressure in the air pressure space 8 is deemed to be unusual, a warning signal is sent out to notify the driver. For example, the electronic control unit stores an information of the maximum load pressure ($P_{max}$) of the vehicle. Also, the electronic control unit carries out an analysis calculation upon the pressure signal of each tire, so as to acquire the current load pressure ($P_L$) of the vehicle tire. Generally, the air inflation pressure regulation provided in the tire specification is based on a cold tire status. Under a static status, the tire pressure of the vehicle varies according to the environmental temperature variation, which is seemingly illustrated with the formula: $\Delta P=(T-t)\div(t+273)\times p\times A$, wherein T refers to the tire temperature (Celsius degree), P refers to the standard tire pressure, t is a normal temperature of 25 Celsius degrees, and A refers to the expansion factor of the tire, wherein A is equal to 0.7. Therefore, the load pressure of the tire is presented as the formula: $(P_L)=P_S-\Delta P$, wherein $P_S$ refers to the tire pressure detected by the tire pressure detector. Therefore, the environmental temperature is needed to be applied to carry out a compensation calculation upon the initial inflation pressure of the tire. Then, the $P_L$ and $P_{max}$ are compared to determine if the vehicle is overloaded. In an embodiment of the present invention, the electronic control unit is allowed to be a notification interface chosen from a vehicle panel, digital display, light signal and sound.

Figure 1:
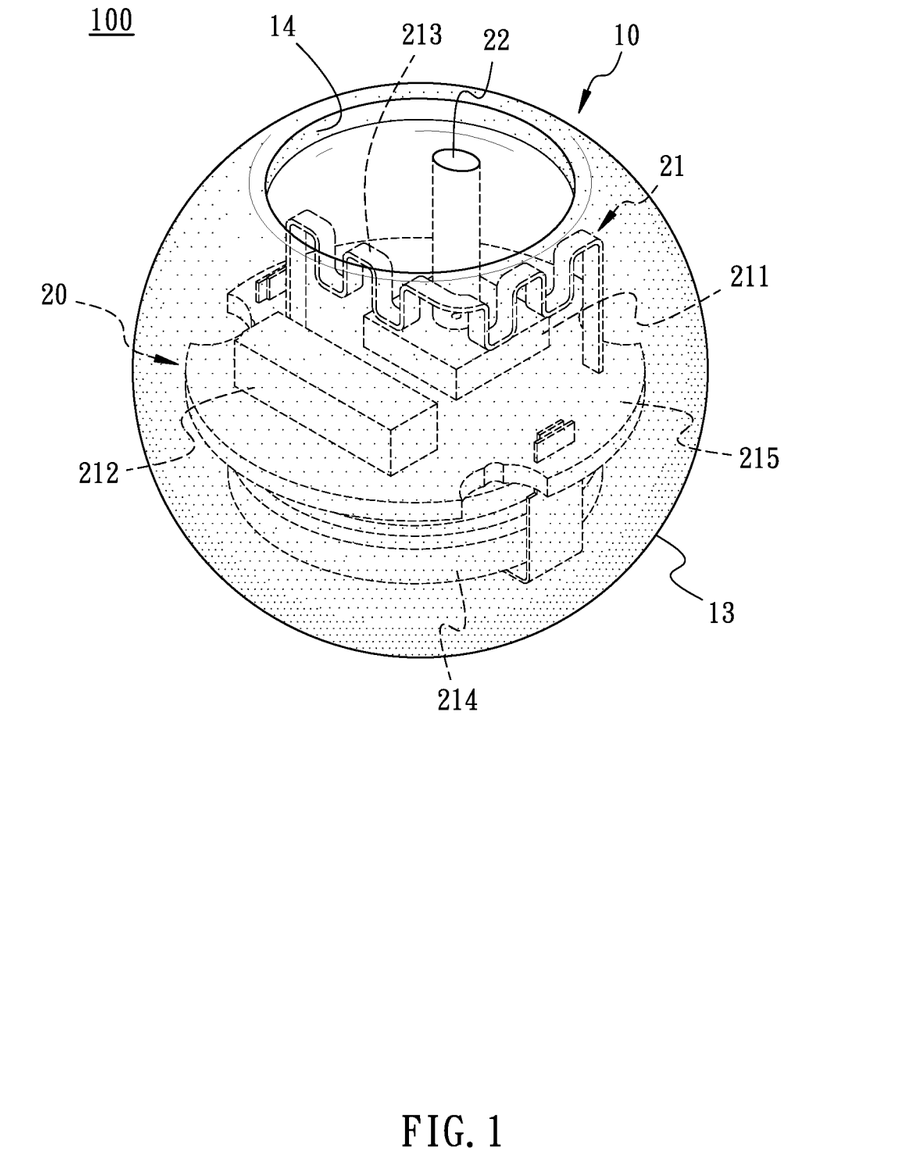
FIG. 1 is a schematic perspective view of the tire pressure detector with protection shell in accordance with an embodiment of the present invention.
Figure 6:
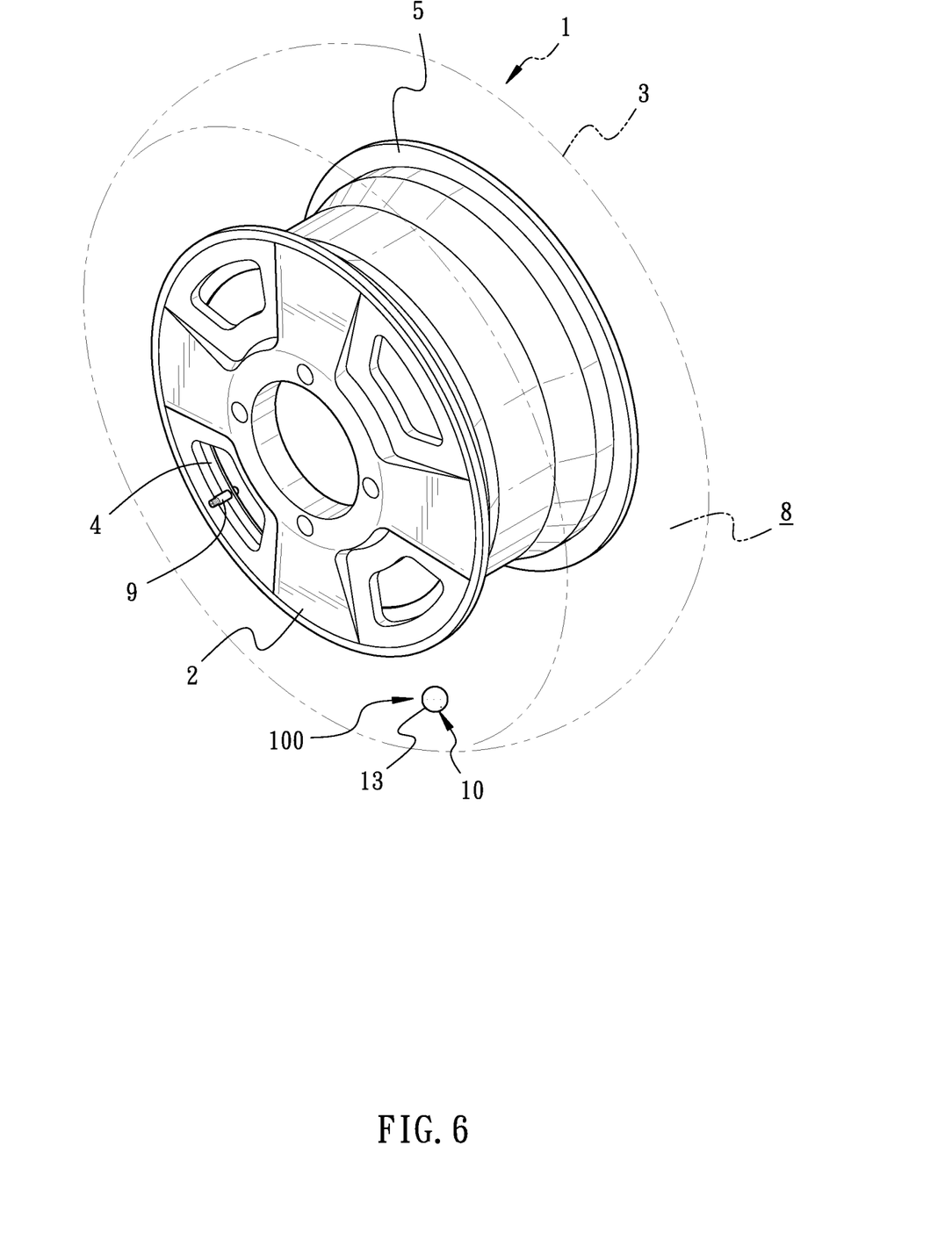
FIG. 6 is a schematic view illustrating the tire pressure detector placed in the air pressure space.
Figure 7:
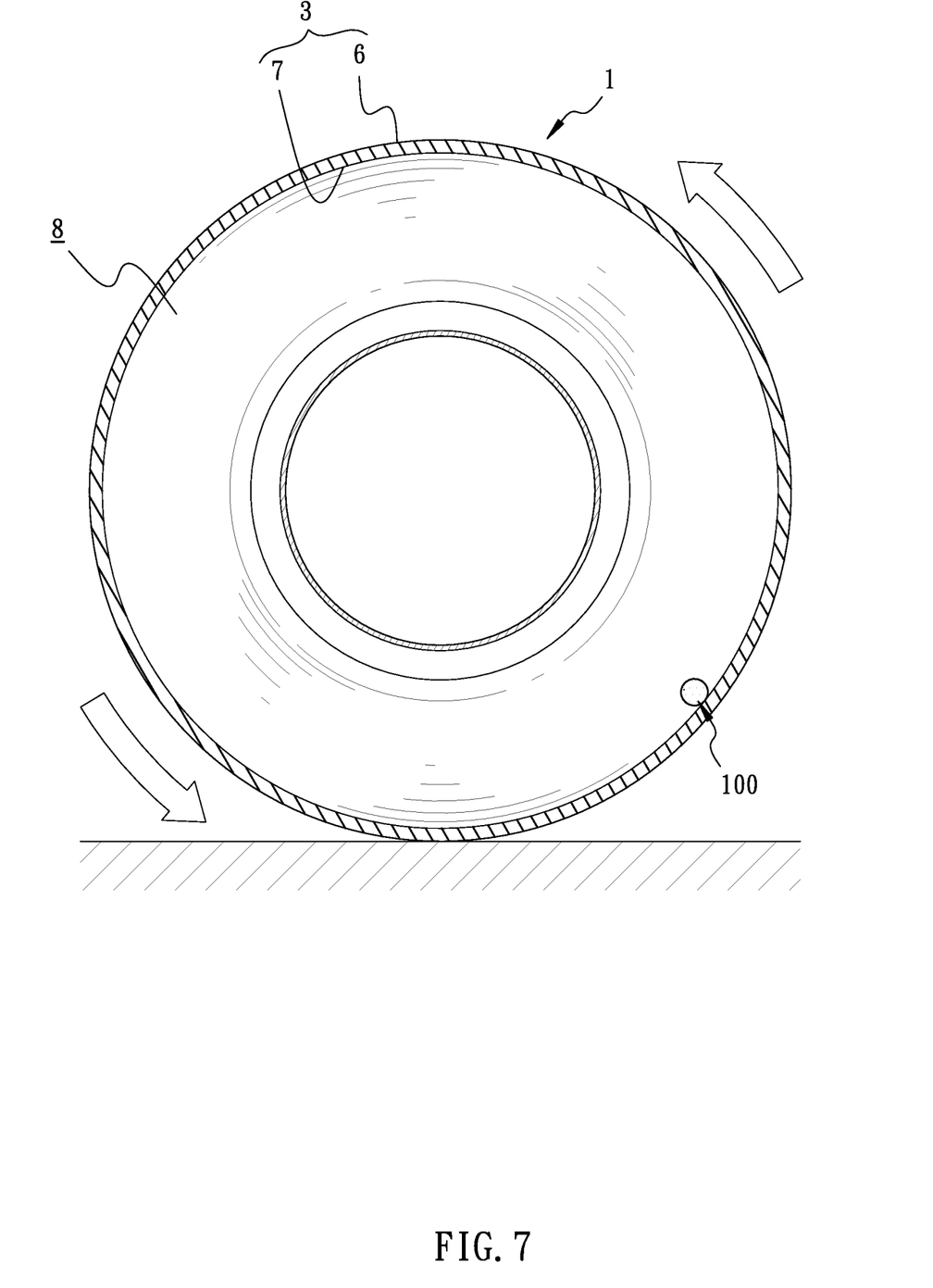
FIG. 7 is a schematic view illustrating the tire pressure detector rolling in the air pressure space.

Referring to FIG. 1, FIG. 6, and FIG. 7, when the tire pressure detector 100 is directly placed in the air pressure space 8, the tire pressure detector 100 moves in the air pressure space 8 along with the rotation of the wheel 1 during the vehicle movement, so as to detect the air pressure in the air pressure space 8 through the detector body 20. Therefore, the tire pressure detector 100 in accordance with the present invention is simply placed in the air pressure space 8 between the tire 3 and the rim 2, without the necessity of being fixed to the rim 2, thus preventing the tire pressure detector 100 from being damaged due to collision during the tire removing process. With such configuration, the tire pressure detector 100 of the present invention is applicable to any types and models of wheel 1 and not limited to a certain type and specification of wheel 1 or confined to a specific position of the air tap 9, improving the application scope of the present invention.

Further, the shell 10 is able to protect the detector body 20 from directly contacting the inner face 7, so as to improve the structural strength of the tire pressure detector 100. The detector body 20 occupies the whole housing space 11 of the shell 10, so that the outer periphery of the detector body 20 fittingly contacts the inner wall 12 or the buffer portions 121. Therefore, when the tire pressure detector 100 moves in the air pressure space 8, the detector body 20 is prevented from randomly rolling with respect to the housing space 11 to be damaged, improving the service life of the tire pressure detector 100.

Additionally, the tire pressure detector 100 in accordance with the present invention is allowed to be applied in a single or plural amount. In the first, second, third, and fourth embodiments, one tire pressure detector 100 is applied. When more than one tire pressure detector 100 are applied, the sphere shaped shell 10 contacts the inner face 7 in a rolling manner, so as to eliminate the imbalance vibration caused by the wheel 1 an other assemblies of the wheel 1, thus balancing the overall mass of the wheel 1 and maintaining the balanced rotation of the wheel 1.

Figure 8:
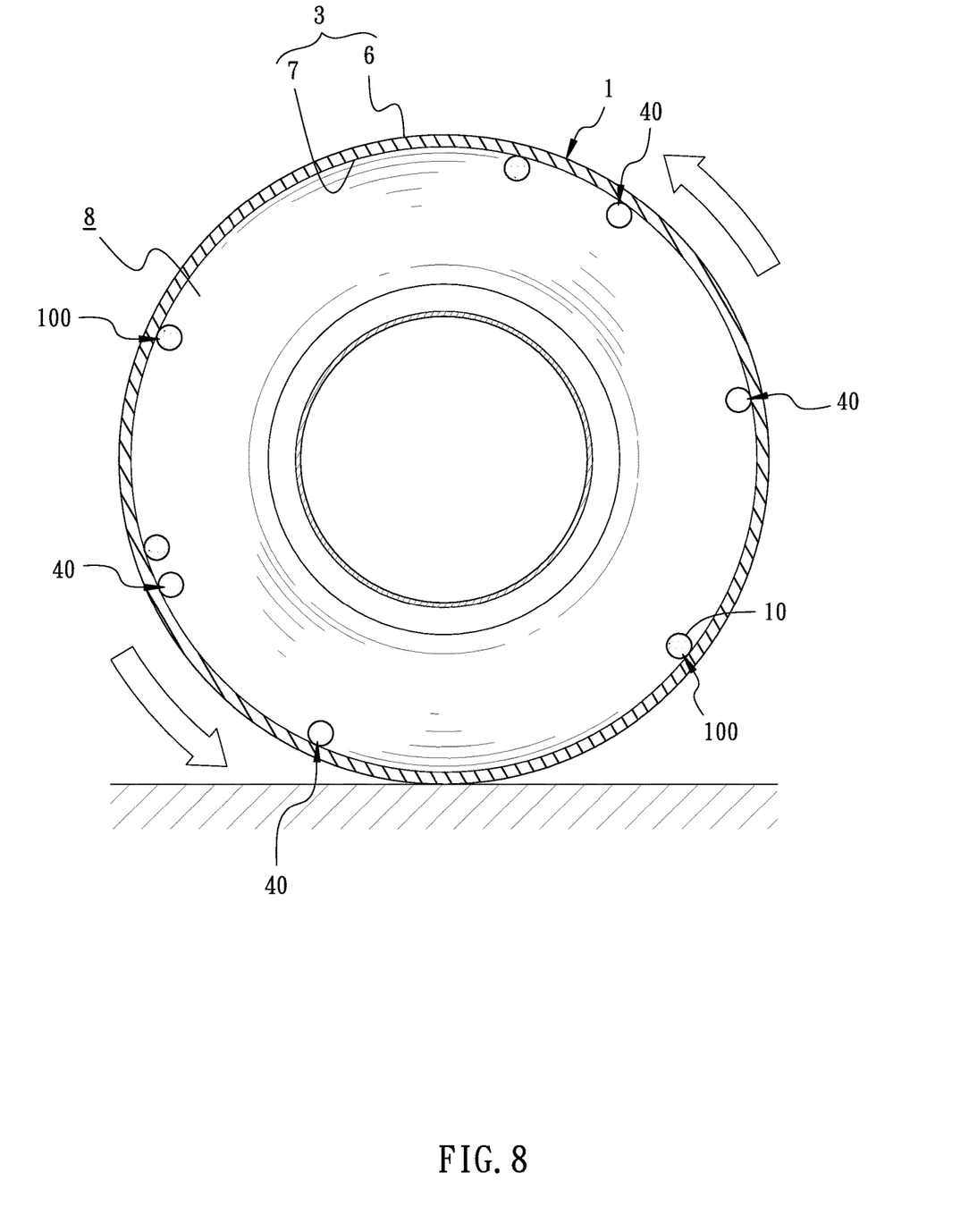
FIG. 8 is a schematic view illustrating a fifth embodiment of the present invention, wherein the tire pressure detector and the balancing member roll in the air pressure space of the tire.

Referring to FIG. 8, in the fifth embodiment of the present invention, the air pressure space 8 in the tire 3 includes the tire pressure detectors 100 and a plurality of balancing members 40. The balancing member 40 is allowed to be made of plastic, rubber, or sand material. Also, the shape of each balancing member 40 is allowed to be identical with or different from the shape of the shell 10 of the tire pressure detector 100. In the embodiment, the balancing member 40 is made of plastic material, and the shape of the balancing member 40 is identical with the shape of the shell 10 of the tire pressure detector 100. Furthermore, sizes of the balancing members 40 and the shells 10 are allowed to vary to be identical or different according to different user demand.

Also, the amount of the tire pressure detectors 100 is allowed to be equal to, larger than, or smaller than the amount of the balancing members 40 according to user demand.

Therefore, when the wheel 1 drives the vehicle to move, the centrifugal force cause by the rotation of the wheel 1 forces the balancing members 40 and the tire pressure detectors 100 to contact the inner face 7 of the tire 3 in a rolling during the movement of the vehicle. With a dynamic balance between the balancing members 40 and the tire pressure detectors 100, the imbalance vibration between the wheel 1 and other assemblies of the wheel 1 is eliminated, thus balancing the movement of the wheel 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire pressure detector with protection shell applied to a wheel of a vehicle, the wheel including a rim and a tire mounted around the rim, with an air pressure space formed between the tire and the rim, the tire pressure detector comprising:
    a shell movably disposed in the air pressure space and including a housing space, the shell also having an inner wall; and
    a detector body disposed in the housing space, the detector body having an outer periphery contacting the inner wall of the shell, the detector body including a detection module, the detection module including a sensing unit, a central processing unit, a wireless transmission unit, and a power unit that are coupled with each other, the power unit providing a power, the sensing unit detecting an air pressure in the air pressure space and generating a pressure signal, the central processing unit wirelessly transmitting the pressure signal through the wireless transmission unit;
    the detector body further comprising a filler, the filler completely enclosing the detection module except for at least one bore formed in the detection body, such that the housing space of the shell is substantially filled by the detector body and the filler.

2. The tire pressure detector of claim 1, wherein the shell comprises an outer wall, the outer wall roll to contact an inner face of the wheel during a rotation of the wheel, and the outer wall comprises a plurality of abrasion portions.

3. The tire pressure detector of claim 2, wherein each abrasion portion is convexly disposed on the outer wall, and a shape of each abrasion portion is selected from a group consisting of a spherical protrusion and a polygonal protrusion.

4. The tire pressure detector of claim 1, wherein the shell comprises an outer wall and an inner wall disposed in opposite to the outer wall, the outer wall roll to contact an inner face of the wheel during a rotation of the wheel, and the inner wall comprises a plurality of buffer portions.

5. The tire pressure detector of claim 4, wherein each buffer portion is convexly disposed on the inner wall, and a shape of each buffer portion is formed in arc shape.

6. The tire pressure detector of claim 1, wherein the shell comprises an opening, the opening is connected with the housing space, the shell is mounted on an outer periphery of the detector body through the opening, and the opening is connected with the bore and the air pressure space, such that the sensing unit detects the air pressure in the air pressure space.

7. The tire pressure detector of claim 6, wherein a diameter of the opening equals to one-tenth to half of a diameter of the shell.

8. The tire pressure detector of claim 6, wherein the shell is made of a thermoplastic elastic material.

9. The tire pressure detector of claim 6, wherein the detector body occupies the whole housing space.

10. The tire pressure detector of claim 1, wherein the detector body is wrapped by the shell, the detector body contains the detection module, the shell comprises an opening, the detector body comprises a bore, and the opening is connected with the bore and the air pressure space, such that the sensing unit detects the air pressure in the air pressure space.

11. The tire pressure detector of claim 1, wherein a shape of the shell is selected from a group consisting of a sphere, an ellipsoid, and a polyhedron.

12. A tire pressure detector with protection shell comprising:
    a shell having a housing space, with a shape of the shell being selected from a group consisting of a sphere, an ellipsoid, and a polyhedron; and
    a detector body disposed in the housing space, the detector body including a detection module, the detection module including a sensing unit, a central processing unit, a wireless transmission unit, and a power unit that are coupled with each other, the power unit providing a power, the sensing unit detecting an air pressure in an air pressure space and generating a pressure signal, the central processing unit receiving the pressure signal and wirelessly transmitting the pressure signal through the wireless transmission unit;
    the detector body further comprising a filler, the filler completely enclosing the detection module except for at least one bore formed in the detection body, such that the housing space of the shell is substantially filled by the detector body and the filler.

13. The tire pressure detector of claim 12, wherein the shell comprises an opening, the opening is connected with the housing space, the shell is mounted on an outer periphery of the detector body through the opening, and the opening is connected with the bore and the air pressure space, such that the sensing unit detects the air pressure in the air pressure space.

14. The tire pressure detector of claim 13, wherein a diameter of the opening equals to one-tenth to half of a diameter of the shell.

* * * * *